United States Patent
Zuo et al.

(10) Patent No.: US 9,206,341 B2
(45) Date of Patent: Dec. 8, 2015

(54) SOLVENT SYSTEM ENABLING THIN FILM DEPOSITION OF EPOXY ADHESIVES FOR HIGH DENSITY PIEZO PRINTHEAD INTERSTITIAL BONDING

(71) Applicant: XEROX CORPORATION, Norwalk, CT (US)

(72) Inventors: Yanjia Zuo, Rochester, NY (US); Mandakini Kanungo, Penfield, NY (US); Pratima Gattu Naga Rao, Sherwood, OR (US); Santokh Badesha, Pittsford, NY (US); John R. Andrews, Wilsonville, OR (US)

(73) Assignee: XEROX CORPORATION, Norwalk, CT (US)

( * ) Notice: Subject to any disclaimer, the term of this patent is extended or adjusted under 35 U.S.C. 154(b) by 49 days.

(21) Appl. No.: 14/253,730

(22) Filed: Apr. 15, 2014

(65) Prior Publication Data

US 2015/0291860 A1    Oct. 15, 2015

(51) Int. Cl.
*B41J 2/135* (2006.01)
*C08K 5/05* (2006.01)
*C08K 5/06* (2006.01)
*C09J 163/00* (2006.01)
*C09J 163/04* (2006.01)

(52) U.S. Cl.
CPC ............... *C09J 163/00* (2013.01); *B41J 2/135* (2013.01); *C08K 5/05* (2013.01); *C08K 5/06* (2013.01); *C09J 163/04* (2013.01)

(58) Field of Classification Search
None
See application file for complete search history.

(56) References Cited

U.S. PATENT DOCUMENTS

| 2014/0292930 | A1* | 10/2014 | Zuo et al. | 347/44 |
| 2014/0338833 | A1* | 11/2014 | Kanungo et al. | 156/281 |
| 2015/0035903 | A1* | 2/2015 | Zuo et al. | 347/44 |

FOREIGN PATENT DOCUMENTS

| DE | 1912028 B | * | 1/1976 |
| JP | 06116368 A | * | 4/1994 |

OTHER PUBLICATIONS

Derwent accession No. 2014-F68123 for Chinese Patent No. 103555246 A, Li et al., Feb. 5, 2014, two pages.*

* cited by examiner

*Primary Examiner* — Robert Sellers
(74) *Attorney, Agent, or Firm* — Shimokaji IP

(57) ABSTRACT

The disclosure provides a solvent system for dissolving an epoxy adhesive such as I2300L epoxy adhesive. The solvent system includes a dialkyl ether solvent and an alkyl alcohol solvent. The disclosure also provides methods for preparing a uniform thin film deposit of an epoxy adhesive for printhead interstitial bonding during their fabrication.

17 Claims, 5 Drawing Sheets

Curing agent: Dicyandiamide

SOLVENT SYSTEM ENABLING THIN FILM DEPOSITION OF EPOXY ADHESIVES FOR HIGH DENSITY PIEZO PRINTHEAD INTERSTITIAL BONDING

TECHNICAL FIELD

This disclosure is generally directed to compositions and methods for the preparation of a high density (HD) piezo printhead for inkjet printing. More specifically, this disclosure is directed to solvent systems and methods for using these solvent systems for enabling thin film deposition of epoxy adhesives for HD piezo printhead interstitial bonding during their fabrication.

BACKGROUND

HD piezo printheads are typically composed of multiple layers or stacks of plates, each plate performing an ascribed function within the printhead. FIG. 1 provides a schematic view of a HD piezo printhead assembly 100 representative of a 150 dpi color or 600 dpi mono printhead. The assembly 100 includes an inlet manifold or port 105 which passes through layers of stackup to a finger 110, a filter 115, an inlet 120, a body 125, an outlet 130, an exit nozzle aperture plate 135, and a nozzle 140. Ink comes in at one of four ports (one for each color of cyan, magenta, yellow, and black) and may be channeled to any of the 7,040 exit nozzles (A3, 4 colors, 150 CNPI, 12" head), for which only one path is illustrated. To bond any combination of plates (e.g., stainless steel, aluminum, or polyimide layers) requires a thin film adhesive.

An ideal adhesive for bonding polymer layers in printheads should include features such as: ink compatibility with solid inks, aqueous inks, UV gels and other commercially available UV inks, oil based inks and solvent based inks; minimum squeeze out of the adhesive to prevent blocking of printhead nozzles; minimum air trapped bubbles to prevent non uniformity in inkjet printhead geometry and occurrence of leaks; good bonding strength, e.g. >200 psi; appropriate storage modulus for compliance and ink jetting requirements; and thermal oxidative stability.

For the HD piezo printhead design, R1500, a thermoset modified acrylic adhesive, has been used for this purpose. This adhesive, when used at a 0.002" thickness, has the ability to take up surface flatness non-uniformities—a requirement at the manifold and heater interfaces of the printhead. However, when printheads fabricated with R1500 adhesive are used with the Xerox UV curable inks or external UV inks (e.g., from Sun Chemicals), the acrylate monomers in these inks adversely interact with R1500 acrylic adhesive. This causes swelling of the adhesive, which as used in the printhead, reduces the inlet diameter and flow rate. Furthermore, increased thickness at the material interfaces affects jetting performance. The R1500 acrylic adhesive film also shows a 160% weight gain in UV inks in six weeks.

By contrast, epoxy adhesives, such as I2300L epoxy adhesive (available from Resin Designs, LLC) described in U.S. Patent Application Publication No. 2013/0135391, the disclosure of which is hereby incorporated by reference in its entirety, have good ink compatibilities with acrylate-based inks as well as with other ink chemistries, for example, wax-based/water-less inks and UV gel inks. Epoxy adhesives, however, may require the addition of solvents for depositing a thin film of the adhesive onto a base material of interest, for example, a stainless steel or polyimide-based materials commonly used in HD piezo printhead fabrication.

There remains a need for solvent systems and methods for enabling thin film deposition of an adhesive for HD piezo printhead interstitial bonding.

SUMMARY

The following detailed description is of the best currently contemplated mode of carrying out exemplary embodiments herein. The description is not to be taken in a limiting sense, but is made merely for the purpose of illustrating the general principles of the exemplary embodiments herein, since the scope of the disclosure is best defined by the appended claims.

Various inventive features are described below that may each be used independently of one another or in combination with other features.

Broadly, embodiments of the disclosure herein generally provide an epoxy adhesive solution which includes an epoxy adhesive; a dialkyl ether solvent selected from the group consisting of dimethoxymethane and dimethoxyethane; and an alkyl alcohol solvent selected from the group consisting of methanol, ethanol, and isopropanol.

In an embodiment, an epoxy adhesive solution includes an epoxy cresol polymer adhesive, a dialkyl ether solvent, and an alkyl alcohol solvent.

In another embodiment, a high density (HD) printhead includes a plurality of layers; and an epoxy adhesive composition between two of the layers, wherein the composition includes an epoxy cresol polymer adhesive.

In yet another embodiment, an epoxy adhesive solution for a high density (HD) printhead comprises an epoxy cresol polymer adhesive, a dialkyl ether solvent, and an alkyl alcohol solvent.

DETAILED DESCRIPTION

According to embodiments herein, an epoxy adhesive may include an epoxy cresol polymer(s); a latent curing agent(s); and optionally one or more co-polymers. These compositions provide epoxy adhesives having a high chemical resistance and thermal stability performance.

Epoxy Adhesive(s)

Novolacs are a class of phenol-formaldehyde polymers linked by a methylene group (—$CH_2$—), with a formaldehyde to phenol molar ratio of less than one. Cresol may be substituted for phenol resulting in a class of ortho-, meta-, and/or para-methyl substituted phenol-formaldehyde polymers linked by a methylene group (cresol-formaldehyde polymers). Reaction of a cresol-formaldehyde polymer with epichlorohydrin produces a propylene oxide substituted cresol-formaldehyde polymer (i.e., epoxy cresol polymer).

As used herein, "epoxy cresol polymer" includes the propylene oxide substituted cresol-formaldehyde polymer and other epoxy substituted cresol-formaldehyde polymers. Epoxy cresol polymers are highly viscous to solid materials. The high epoxide content in these polymers forms a highly cross-linked network, which provides the resulting polymer with a high temperature and chemical resistance, particularly chemical resistance to acrylate monomers found in many printing inks and gels.

In an embodiment, the epoxy cresol polymer(s) may be present in an amount of from about 1 weight % to about 10 weight %, or from about 2 weight % to about 8 weight %, or from about 2 weight % to about 5 weight %, or about 4 weight of the epoxy adhesive composition.

In an embodiment, the epoxy cresol polymer is an ortho-epoxy cresol polymer, which is present in I2300L epoxy adhesive shown below in Table 1.

TABLE 1

| Chemical Description | CAS # | Weight, % |
|---|---|---|
| Bisphenol A Epoxy Polymer | 25036-25-3 | 11-17 |
| Bisphenol A Epoxy Polymer | 25068-38-6 | 5-7 |
| Latent Curing Agent | 461-58-5 | 2-3 |
| epoxy ortho-cresol polymer | 29690-82-2 | 68-72 |

As shown in Table 1, commercially available I2300L epoxy adhesive (without CAB-O-SIL®) includes an epoxy ortho-cresol polymer, along with two bisphenol A epoxy polymers, and a latent curing agent such as dicyandiamide. CAB-O-SIL® is fumed silica made from flame pyrolysis of silicon tetrachloride or from quartz sand vaporized in a 3000° C. electric arc and is sold by Cabot Corporation.

Figure 1:
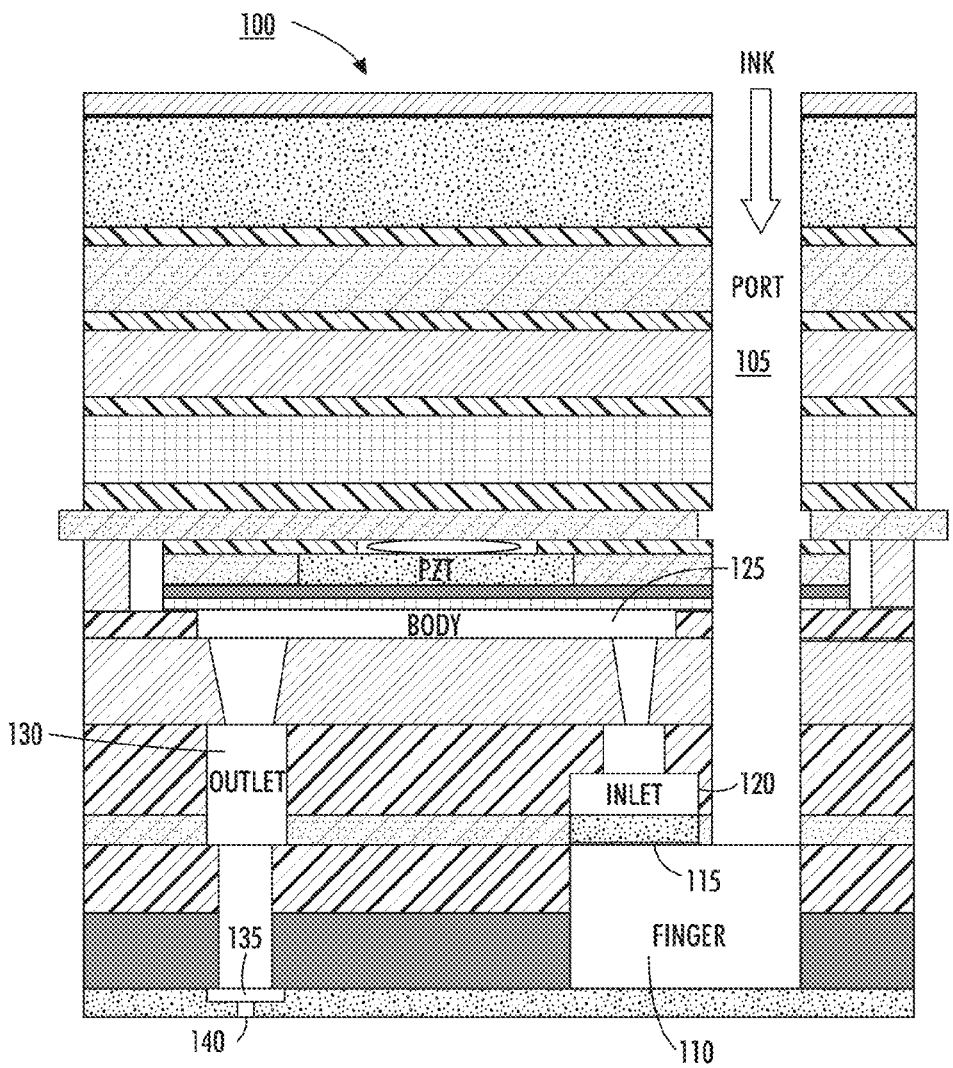
FIG. 1 illustrates a HD piezo printhead design prepared with R1500 acrylic adhesive for interstitial bonding of the stackup layers.
Figure 2:
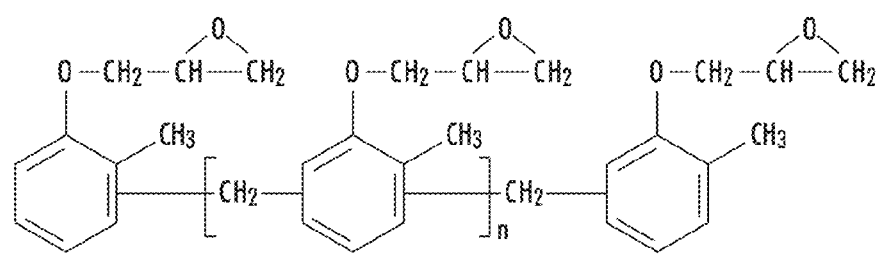
FIG. 2 illustrates the chemical components of an I2300L epoxy adhesive composition.
Figure 2:

FIG. 2 illustrates the chemical structures for the ortho-epoxy cresol polymer, the latent curing agent (dicyandiamide), and bisphenol A epoxy polymers present in the I2300L epoxy adhesive.

In an embodiment, I2300L epoxy adhesive is present in an amount of from about 1 weight % to about 10 weight %, or from about 2 weight % to about 8 weight %, or from about 4 weight % to about 6 weight %, or about 5 weight % of the epoxy adhesive solution.

Curing Agent(s)

In an embodiment, the curing agent is dicyandiamide which may be present in an amount of from about 1 weight % to about 5 weight %, or from about 1.5 weight % to about 4 weight %, or from about 2 weight % to about 3 weight % of the epoxy adhesive composition.

Dicyandiamide is a latent curing agent that forms crystals having a high melting point of about 207° C. to 210° C. Dicyandiamide has a pot life of 24 hours when it is dissolved in an epoxy polymer using a solvent or the like, but it is normally used in the form of a fine powder dispersed in an epoxy polymer, which has a very long pot life of 6 to 12 months. Dicyandiamide cures at high temperatures of 160° C. to 180° C. in 20 to 60 minutes. The cured polymers have good adhesiveness and are less prone to staining. Optionally, an accelerator may be used with dicyandiamide, for example, basic compounds including but not limited to tertiary amines, imidazole, aromatic amines, and the like.

Other suitable curing agents herein include but are not limited to primary, secondary and tertiary amines. Amines may further be classified into aliphatic, alicyclic, and aromatic amines. In general, these types of curing agents have more than three active hydrogen atoms and two amino groups in a molecule so that the cured polymer becomes cross-linked. The curing speed of a curing agent depends on the type and loading of the amine and the type of epoxy resin.

Aliphatic polyamine curing agents include but are not limited to diethylenetriamine (DTA), triethylenetetramine (TTA), tetraethylenepentamine (TEPA), diproprenediamine (DPDA), diethylaminopropylamine (DEAPA), 1,6-hexamethylenediamine (NMDA), and the like.

Alicyclic polyamine curing agents include but are not limited to N-aminoethylpiperazine (N-AEP), 4-[(4-amino-3-methylcyclohexyl)methyl]-2-methyl-cyclo-hexan-1-amine (Lamiron C-260), menthane diamine (MDA), isophoronediamine (IPDA), 4,4'-diaminodicyclohexyl methane (Wandamin HM), 1,3-bis(amino-methyl)-cyclohexane (1,3-BAC), and the like.

Aliphatic aromatic amines include but are not limited to meta-xylenediamine (m-XDA), Sho-amine X (xylylenediamine), Amine black (xylylenediamine trimer), Sho-amine black (xylylenediamine trimer), Sho-amine N (xylylenediamine derivative), Sho-amine 1001 (xylylenediamine derivative), Sho-amine 1010 (xylylenediamine derivative), and the like.

Aromatic amines include but are not limited to meta-phenylene diamine (MPDA), diaminodiphenylmethane (DDM), diaminodiphenylsulfone (DDS) and the like.

Solvent(s)

According to embodiments, the epoxy adhesive can be dissolved in a solvent(s) that is present in an amount of from about 1 weight % to about 10 weight %, or from about 2 weight % to about 8 weight %, or from about 4 weight % to about 6 weight %, or about 5 weight % of the epoxy adhesive solution.

Embodiments of the solvents can comprise one or more dialkyl ethers and/or one or more alkyl alcohols.

In embodiments, dialkyl ethers can include compounds having formula: $(C_1-C_{12})$alkyl-O—$(C_1-C_{12})$alkyl-O—$(C_1-C_{12})$alkyl, or formula $(C_1-C_{12})$alkyl-O—$(C_1-C_6)$alkyl-O—$(C_1-C_{12})$alkyl, or formula $(C_1-C_6)$alkyl-O—$(C_1-C_6)$alkyl-O—$(C_1-C_6)$alkyl, wherein each alkyl group may independently be a straight-chain, a branched chain and/or contain cyclic groups.

Exemplary dialkyl ethers herein can include: dimethoxymethane (methylal, $CH_3OCH_2OCH_3$), diethoxymethane ($CH_3CH_2OCH_2OCH_2CH_3$), dipropoxymethane ($CH_3CH_2CH_2OCH_2OCH_2CH_2CH_3$), dibutoxymethane ($CH_3CH_2CH_2CH_2OCH_2O$—$CH_2CH_2CH_2CH_3$), dimethoxyethane (DME, ethylene glycol dimethyl ether, glyme, monoglyme, dimethyl glycol, dimethyl cellosolve, ($CH_3OCH_2CH_2OCH_3$)), diethoxyethane (ethylene glycol diethyl ether ($CH_3CH_2OCH_2CH_2OCH_2CH_3$); dipropoxyethane (ethylene glycol dipropyl ether, $CH_3CH_2CH_2OCH_2CH_2O$—$CH_2CH_2CH_3$), dibutoxyethane (ethylene glycol dibutyl ether, $CH_3CH_2CH_2CH_2O$—$CH_2CH_2OCH_2CH_2CH_2CH_3$), and the like. These compounds are clear, colorless, aprotic, and high boiling liquid ether solvents in comparison to diethyl ether and tetrahydrofuran (THF) solvents.

In embodiments, alkyl alcohols can include compounds having formula: $(C_1-C_{12})$alkyl-OH or formula $(C_1-C_6)$alkyl-OH, wherein each alkyl group may independently be a straight-chain, a branched chain, and/or contain cyclic groups.

Exemplary alkyl alcohols herein can include: methanol ($CH_3OH$), ethanol ($CH_3CH_2OH$), n-propanol ($CH_3CH_2CH_2OH$), isopropanol (($CH_3)_3COH$), n-butanol ($CH_3CH_2CH_2CH_2OH$), sec-butanol ($CH_3CH(CH_2OH)$ CH$_3$), and the like, are light, volatile, colorless, flammable liquids with distinctive odors, which are used as polar, protic liquid solvents.

In embodiments herein, the dialkyl ether(s) can be present in an amount of from about 65 weight % to about 75 weight %, or from about 60 weight % to about 75 weight %, or from about 50 weight % to about 80 weight % of the epoxy adhesive solution.

In embodiments herein, the alkyl alcohol(s) can be present in an amount of from about 25 weight % to about 35 weight %, or from about 30 weight % to about 40 weight %, or from about 20 weight % to about 50 weight % of the epoxy adhesive solution.

In an embodiment, the dialkyl ether solvent is dimethoxyethane and the alkyl alcohol solvent is methanol, in which dimethoxyethane and methanol are present in the epoxy adhesive composition of about 60 weight % dimethoxyethane and about 35 weight % methanol, or of about 65 weight % dimethoxyethane and about 30 weight % methanol, or of about 70 weight % dimethoxyethane and about 25 weight % methanol of the epoxy adhesive solution.

Organic solvents for diluting the epoxy adhesive may also include the addition of a small amount of water in order to solubilize the curing agent, e.g., the dicyandiamide component. However, water has a much lower vapor pressure at room temperature than most organic solvents and, consequently, a thin film coating or deposit of an epoxy cresol polymer adhesive, such as I2300L epoxy adhesive, may not be uniform on drying due to the water residue, which cannot dry out of the film concurrently with the organic solvents.

As shown in Table 2, dialkyl ether organic solvents; and polar, protic, alkyl alcohol solvents such as methanol; have a higher vapor pressure than water. Consequently, a thin film coating or deposit of an epoxy cresol polymer adhesive, such as I2300L epoxy adhesive, when dissolved in a co-solvent mixture of dimethoxyethane and methanol, can provide a uniform film upon drying without any residual water.

TABLE 2

| | Water | DME (Dimethoxyethane) | Methanol |
|---|---|---|---|
| CAS Number | 7732-18-5 | 110-71-4 | 67-56-1 |
| Molecular Formula | H$_2$O | C$_4$H$_{10}$O$_2$ | CH$_4$O |
| Molecular Mass | 18.01528 g/mol | 90.12 g/mol | 32.04 g/mol |
| Boiling Point | 99.98° C. | 85° C. | 64.7° C. |
| Vapor Pressure (20° C.) | 17.5 mmHg | 48 mmHg | 97 mmHg |

In embodiments, the bonding strength of the epoxy adhesive may be from about 200 psi to about 3,000 psi, or from about 300 psi to about 2,000 psi, or from about 500 psi to about 1,500 psi, as measured from lap shear testing.

Epoxy Adhesive Coating or Deposit

In embodiments, when an epoxy adhesive solution herein is applied to the surface of a polyimide baseline material and allowed to dry, the resulting thin film epoxy adhesive coating or deposit may have a film thickness from about 1 micron to about 25 microns, or from about 2 micron to about 10 microns, or from about 2 micron to about 5 microns.

After application of the epoxy adhesive solution to a baseline material (e.g. stainless steel, aluminum, or polyimide layer), the thin film epoxy adhesive coating or deposit may have a smooth surface with a reduction in air bubbles from about 80% to about 99%, or from about 85% to about 98%, or from about 90% to about 95%, when compared to an epoxy adhesive coating or deposit prepared with methylene chloride.

In embodiments, the surface roughness of the thin film epoxy adhesive coating or deposit may be from about 0.1 micron to about 2 microns peak to valley, or from about 0.1 microns to about 1 micron peak to valley, or from about 0.3 microns to about 0.8 microns peak to valley, or about 0.6 microns peak to valley, where the surface topography measurements are performed on the films using Tencor Surfscan.

In embodiments, the thin film epoxy adhesive coating or deposit may have minimal weight gain over time, for example from about 0.1% to about 10%, or from about 0.5% to about 5%, or from about 1% to about 3% over 32 weeks.

EXAMPLES

The following examples illustrate embodiments of the instant disclosure. The Examples are intended to be illustrative only and are not intended to limit the scope of the disclosure.

Example I

Preparation of I2300L Epoxy Adhesive Composition

The preparation of a solution of I2300L epoxy adhesive composition involved two steps:

STEP 1: Mix the I2300L epoxy adhesive with a dialkyl ether, such as dimethoxyethane (DME), to make about a 5 weight % solution of the I2300L epoxy adhesive; and STEP 2: Slowly add an alkyl alcohol, such as methanol into the mixture prepared in STEP 1, until the solution becomes clear. The final concentration of I2300L epoxy adhesive is about 3.5 weight %.

In one embodiment of Example 1, the addition of about 95 grams of dimethoxyethane to about 5 grams of I2300L epoxy adhesive (STEP 1), followed by the addition of about 43 grams of methanol (STEP 2), provided a final I2300L epoxy adhesive concentration of about 3.5 weight %.

Example II

I2300L Coated Polyimide Film Preparation

I2300L epoxy adhesive coated polyimide film was prepared for bonding performance evaluation. The procedure of I2300L epoxy adhesive coated polyimide film preparation included:

Step 1: I2300L epoxy adhesive was dissolved in dimethoxyethane and methanol as described in Example 1, to form about a 3.5 weight % I2300L epoxy adhesive that may be coatable.

Step 2: The above about 3.5 weight % I2300L epoxy adhesive composition was draw bar coated to form a thin uniform film on the polyimide surface. The polyimide surface was oxygen plasma treated before coating.

Step 3: The I2300L epoxy adhesive film coating was allowed to air dry for about 30 minutes to about an hour, to allow the solvents to evaporate to provide a thin film of the epoxy adhesive coating or deposit.

Figure 3:
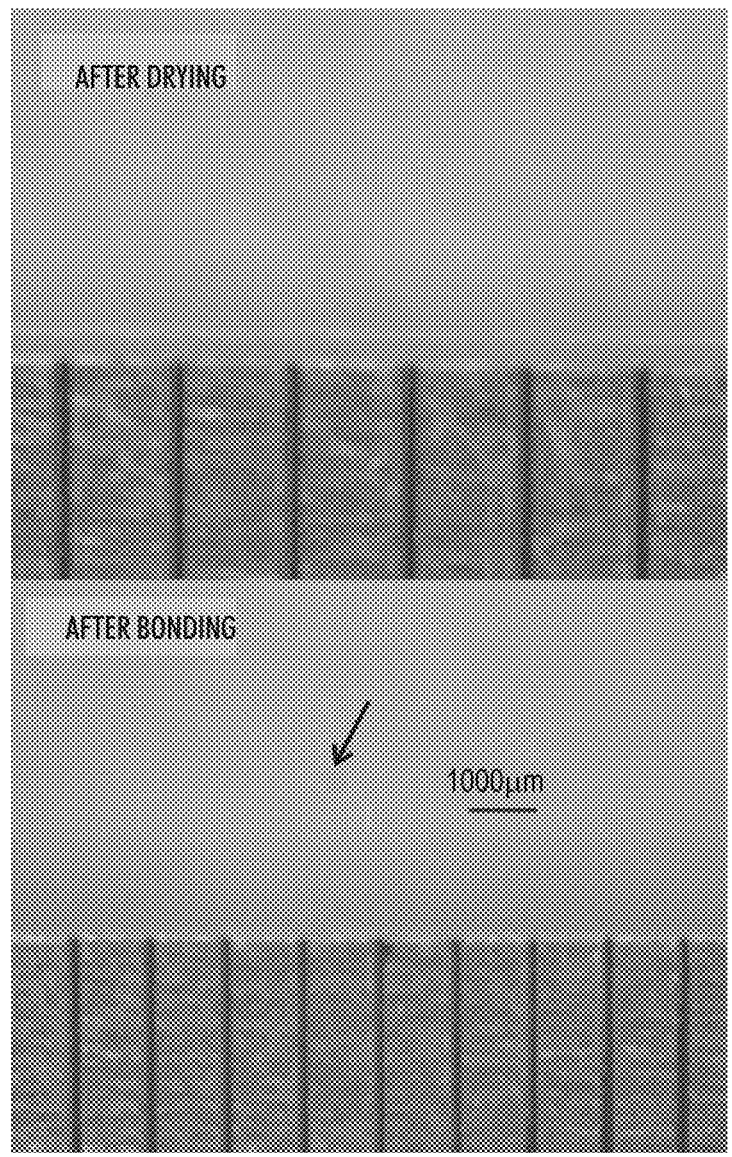
FIG. 3 illustrates a thin film of an I2300L epoxy adhesive composition prepared using two solvents on a baseline material.

FIG. 3 illustrates a schematic view of an I2300L epoxy adhesive composition coated as a film on top of a polyimide base or support as prepared according to Example II.

Example III

I2300L Coated Polyimide Film Preparation

Figure 4:
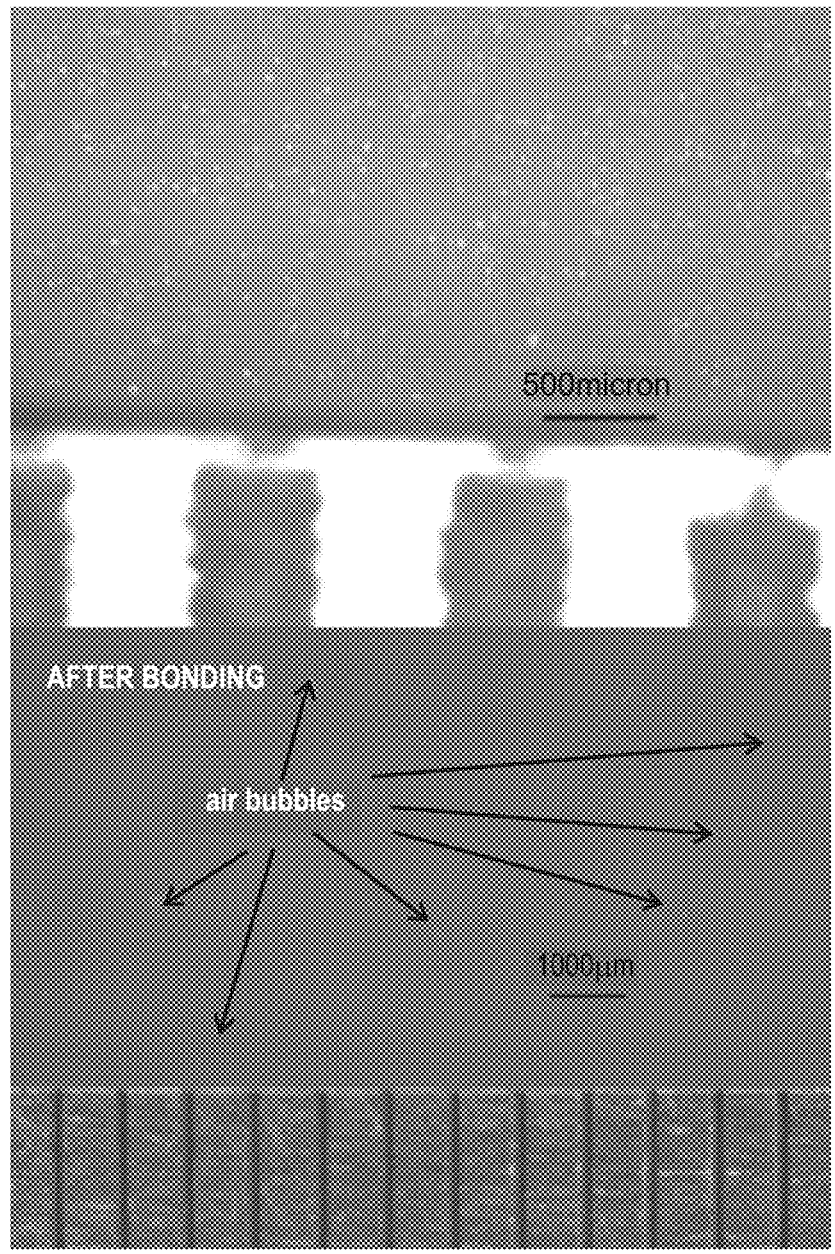
FIG. 4 illustrates a thin film of an I2300L epoxy adhesive composition prepared using a single solvent on a baseline material.

A solution of I2300L epoxy adhesive was prepared using methylene chloride as the solvent. As shown in FIG. 4, when methylene chloride was used to dilute I2300L epoxy adhesive before dispensing, air voids or air bubbles were formed after drying on the surface of the base material due to the non-dissolvable solid contents present in the epoxy adhesive formulation, e.g. the polar latent curing agent dicyandiamide. In addition to this non-uniformity, which may affect the geometry and integrity of the printhead, bonding strength between the layers was reduced. Other organic solvents, for example, methyl ethyl ketone, toluene, ethylene glycol, tetrahydrofuran, and the like, cannot dissolve I2300L epoxy adhesive as well as methylene chloride, and air voids or air bubbles results at the bonding interface upon drying when the solvents were used.

Figure 5:
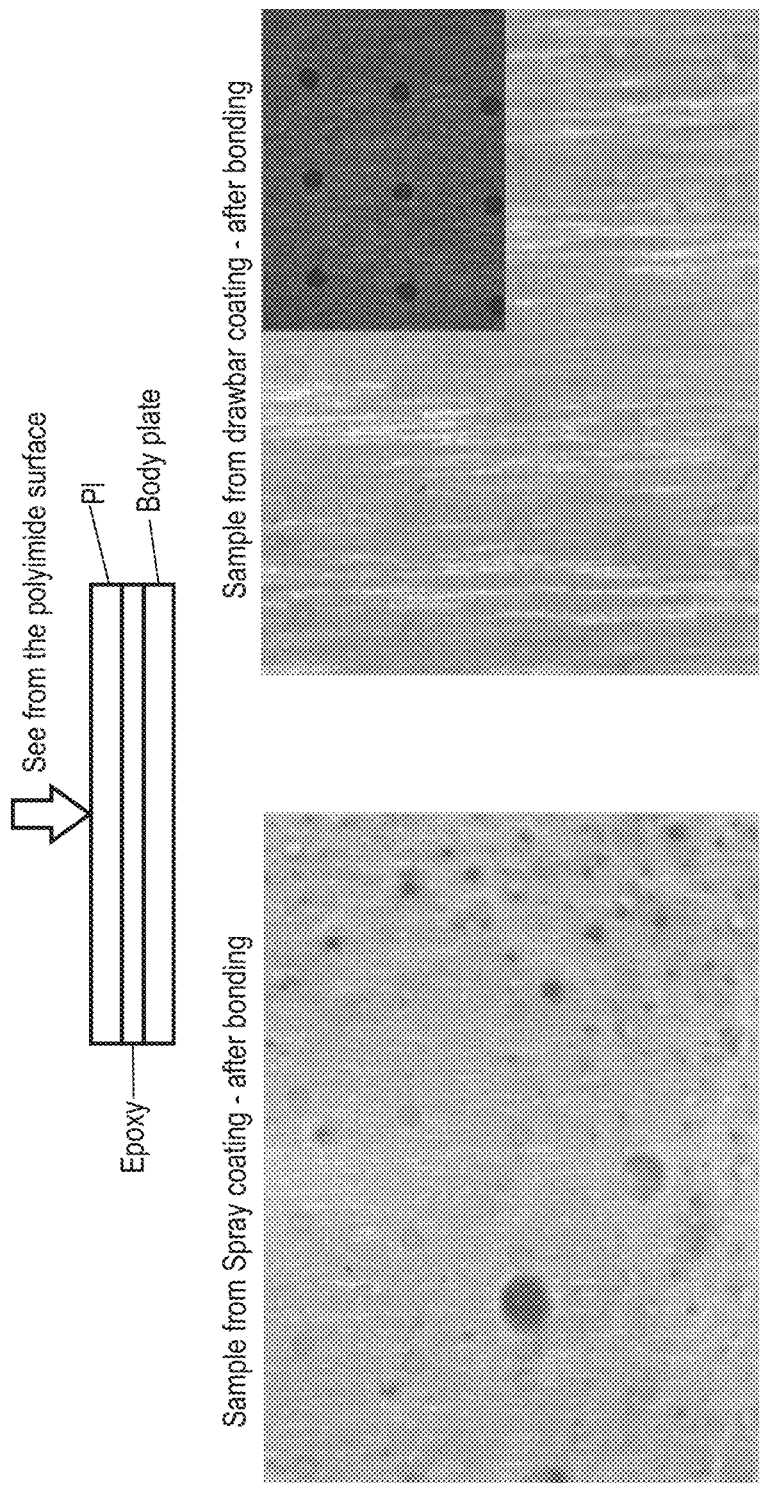
FIG. 5 illustrates a schematic view of an I2300L epoxy adhesive composition bonding together a bottom stainless steel body plate and a top polyimide plate.

As shown in FIG. 5, two thin film I2300L epoxy adhesive bonding structures were prepared for comparison and evaluation of their bonding performance. A first film was prepared from I2300L epoxy adhesive dissolved in methylene chloride according to Example III to provide a 50 weight % solution of I2300L epoxy adhesive, which was then spray coated onto a stainless steel body plate. After drying, 1 mil polyimide was bonded on top at 190° C./70 min/200 psi. A second film was prepared from about a 3.5% I2300L epoxy adhesive composition using dimethoxyethane-methanol as described in Example 1. A thin layer of the I2300L epoxy adhesive composition was deposited onto 1 mil polyimide using a draw bar. After drying, the epoxy coated polyimide was bonded with a stainless steel body plate at 190° C./70 min/200 psi.

Surface topography measurements were performed on these films using Tencor Surfscan. Surface roughness of the first film was ~8 micron peak to valley. By contrast, the surface roughness of the second film was ~0.6 micron peak to valley. Thus, the surface roughness of the film was significantly reduced using co-solvents dimethoxyethane/methanol in the I2300L epoxy adhesive composition.

It will be appreciated that variations of the above-disclosed and other features and functions, or alternatives thereof, may be desirably combined into many other different systems or applications. Also that various, presently unforeseen or unanticipated, alternatives, modifications, variations or improvements therein may be subsequently made by those skilled in the art which are also intended to be encompassed by the following claims.

What is claimed is:

1. An epoxy adhesive solution, comprising:
 an epoxy adhesive;
 a dialkyl ether solvent selected from the group consisting of dimethoxymethane and dimethoxyethane; and
 an alkyl alcohol solvent that is methanol;
 wherein the methanol is present in an amount of from about 25 weight % to about 35 weight % of the solution.

2. The solution of claim 1, wherein the dialkyl ether solvent is dimethoxyethane.

3. The solution of claim 1, wherein the epoxy adhesive comprises an epoxy cresol polymer.

4. The solution of claim 1, wherein the epoxy adhesive comprises an epoxy ortho-cresol polymer, a bis-phenol A epoxy polymer, and dicyandiamide.

5. The solution of claim 4, wherein the epoxy adhesive exists exclusive of fumed silica.

6. The solution of claim 1, wherein the epoxy adhesive is present in an amount of from about 1 weight % to about 10 weight % of the solution.

7. An epoxy adhesive solution, comprising:
 an epoxy cresol polymer adhesive;
 a dialkyl ether solvent; and
 an alkyl alcohol solvent;
 wherein the dialkyl ether solvent is dimethoxyethane and the alkyl alcohol solvent is methanol;
 wherein the dimethoxyethane is present in an amount of from about 65 weight % to about 75 weight % of the solution.

8. The solution of claim 7, wherein the methanol is present in an amount of from about 25 weight % to about 35 weight % of the solution.

9. The solution of claim 7, wherein the epoxy adhesive comprises an epoxy ortho-cresol polymer, a bis-phenol A epoxy polymer, and dicyandiamide.

10. The solution of claim 7, wherein the epoxy cresol polymer is present in an amount of from about 1 weight % to about 10 weight % of the solution.

11. The solution of claim 7, wherein the epoxy adhesive has a bonding strength of from about 200 psi to about 3,000 psi.

12. A high density (HD) printhead, comprising:
 a plurality of layers; and
 an epoxy adhesive between two of the layers, wherein the epoxy adhesive is formed from a solution that includes:
  an epoxy cresol polymer adhesive; and
  dimethoxyethane that is present in an amount of from about 65 weight % to about 75 weight % of the solution.

13. The printhead of claim 12, wherein the epoxy adhesive has a bonding strength of from about 200 psi to about 3,000 psi.

14. The printhead of claim 12, wherein the epoxy adhesive has a film thickness of from about 1 micron to about 25 microns.

15. The printhead of claim 12, wherein the epoxy adhesive has a surface roughness of from about 0.1 micron to about 1 micron, peak to valley.

16. The printhead of claim 12, wherein the epoxy adhesive has a weight gain of from about 0.1% to about 10% over thirty two weeks.

17. The printhead of claim 12, wherein one of the layers comprises polyimide.

* * * * *